United States Patent
Kim et al.

(10) Patent No.: US 8,055,740 B2
(45) Date of Patent: Nov. 8, 2011

(54) WIRELESS SENSOR NETWORK SYSTEM AND CLUSTER MANAGEMENT METHOD THEREOF

(75) Inventors: Eui Jik Kim, Suwon-si (KR); Hyo Hyun Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 504 days.

(21) Appl. No.: 12/248,122

(22) Filed: Oct. 9, 2008

(65) Prior Publication Data

US 2009/0092112 A1  Apr. 9, 2009

(30) Foreign Application Priority Data

Oct. 9, 2007  (KR) .................. 10-2007-0101195

(51) Int. Cl.
*G06F 15/16* (2006.01)

(52) U.S. Cl. ............ 709/221; 709/201; 709/209; 700/3; 370/254

(58) Field of Classification Search .................. 709/201, 709/208, 209, 220, 221; 370/254; 700/3
See application file for complete search history.

(56) References Cited

OTHER PUBLICATIONS

Kim et al., "Energy-Efficient Clustering Algorithm in Wireless Sensor Networks" EUC 2006, LNCS vol. 4096, pp. 1078-1088.*

* cited by examiner

*Primary Examiner* — David Lazaro
(74) *Attorney, Agent, or Firm* — Cha & Reiter, LLC

(57) ABSTRACT

A wireless sensor network system and a cluster management method thereof. The wireless sensor network system includes at least one cluster having at least one sensor node for collecting sensing data, and a cluster head for aggregating the sensing data from the at least one sensor node. A sink node collects the aggregated sensing data from the at least one cluster, wherein the cluster head of a first cluster determines a cluster size of the first cluster, and when the first cluster is a master cluster and the cluster size of the first cluster is less than a threshold size, merges, the first cluster into a second master cluster, and switches the first cluster to a slave cluster. In each cluster, management efficiency can thereby be maintained within a specified range, and the lifetime of a wireless sensor network can be prolonged by reducing energy consumption.

17 Claims, 6 Drawing Sheets

WIRELESS SENSOR NETWORK SYSTEM AND CLUSTER MANAGEMENT METHOD THEREOF

CLAIM OF PRIORITY

This application claims priority under 35 U.S.C. 119 from an application entitled "WIRELESS SENSOR NETWORK SYSTEM AND CLUSTER MANAGEMENT METHOD THEREOF" filed in the Korean Intellectual Property Office on Oct. 9, 2007 and assigned Serial No. 2007-0101195, the contents of which are incorporated herein by reference in its entirety.

BACKGROUND OF THE INVENTION

1. Field of the Invention

The present invention relates to a wireless sensor network system and a clustering method thereof. More particularly, the present invention relates to a wireless sensor network system including a plurality of clusters and a cluster management method thereof.

2. Description of the Related Art

A wireless sensor network typically includes a plurality of clusters and a sink node for collecting sensing data from each cluster. Each cluster comprises a cluster head including one sensor node selected from a plurality of sensor nodes, and the remaining sensor nodes. In operation, the cluster head of a cluster aggregates sensing data received from each of the sensor nodes of the cluster and transfers the aggregated sensing data to the sink node. Presently, the cluster head is powered by a battery, and there is a significant amount of difficulty to replace and/or recharge the battery. In view of this difficulty, an energy consumption level of the cluster head may be an important parameter that determines the lifetime of the wireless sensor network.

However, the above-described wireless sensor network has a problem in that the cluster head consumes a large amount of energy for data aggregation. The problem regarding energy consumption becomes more serious as the number of sensor nodes included in a cluster increases. Another problem with the above-described wireless sensor network is that sensor node management efficiency is degraded when the number of sensor nodes included in the cluster is excessively small. Consequently, a need exists for a cluster management method capable of properly maintaining the number of sensor nodes included in a cluster.

SUMMARY OF THE INVENTION

The present invention provides a cluster management method of a wireless sensor network system having a plurality of clusters, an example of which may include: determining, by a first cluster, the cluster size of the first cluster; merging, when the first cluster is a master cluster and the cluster size of the first cluster is less than a threshold size, by the first cluster, the first cluster into a second master cluster; and switching the first cluster to a slave cluster.

According to another example, the present invention provides a wireless sensor network system that may include: at least one cluster having at least one sensor node for collecting sensing data and having a cluster head for aggregating the sensing data from the at least one sensor node; and a sink node for collecting the aggregated sensing data from the at least one cluster, wherein, when a first cluster is a master cluster and the cluster size of the first cluster is less than a threshold size, the cluster head of the first cluster determines the cluster size of the first cluster, merges the first cluster into a second master cluster, and switches the first cluster to a slave cluster.

According to an exemplary aspect of the invention, the wireless sensor system and the cluster management method thereof merges a first cluster into another cluster when the cluster size of the first cluster is less than a threshold size. When the cluster size of the first cluster is equal to or greater than a maximum size after the merge operation, the first cluster splits from the other cluster. When the cluster size of the first cluster is equal to or greater than a maximum size, a joining step is not performed in the first cluster. Each cluster can maintain the cluster size to be equal to or greater than the threshold size and less than the maximum size. In each cluster, management efficiency can thereby be maintained in a specified range. Further the lifetime of a wireless sensor network can be prolonged by reducing energy consumption in each cluster.

BRIEF DESCRIPTION OF THE DRAWINGS

The above and other exemplary objects, features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings. The examples of the cluster management method and wireless sensor network are provided only for purposes of illustration, and the claimed invention is in no way limited to the examples shown and described. The same reference numbers are used throughout the drawings to refer to the same or like parts. For the purposes of clarity and simplicity, detailed descriptions of well-known functions and structures incorporated herein may be omitted to avoid obscuring appreciation of the subject matter of the present invention by a person of ordinary skill in the art.

In the following description, the expression "cluster size" typically refers to the number of sensor nodes in a cluster. That is, the cluster size is the total number of sensor nodes, including the sensor node of a cluster head and the remaining sensor nodes. Each parent sensor node determines the number of child nodes. When the number of child nodes changes, the child sensor nodes notify their parent nodes of the changes. Thus, the cluster head determines the size of the cluster. When the cluster size changes, the cluster head notifies the sensor nodes of the cluster of the changed cluster size. Accordingly, all the sensor nodes of the cluster, that is, in the cluster head and the remaining sensor nodes, can determine the cluster size. The expression "threshold size" typically refers to a threshold value for the number of sensor nodes to be included in a cluster, which is determined by sensor node management efficiency of the cluster. The expression "maximum size" typically refers to a maximum value of the number of sensor nodes able to be included in a cluster.

The expression "master cluster" typically refers to a cluster in which data is independently aggregated. In other words, the cluster head of a master cluster typically aggregates data and transfers the aggregated data to a sink node. The expression "slave cluster" typically refers to a cluster dependant on a master cluster. That is, the cluster head of a slave cluster aggregates data and then transfers the aggregated data to the corresponding master cluster.

Figure 1:
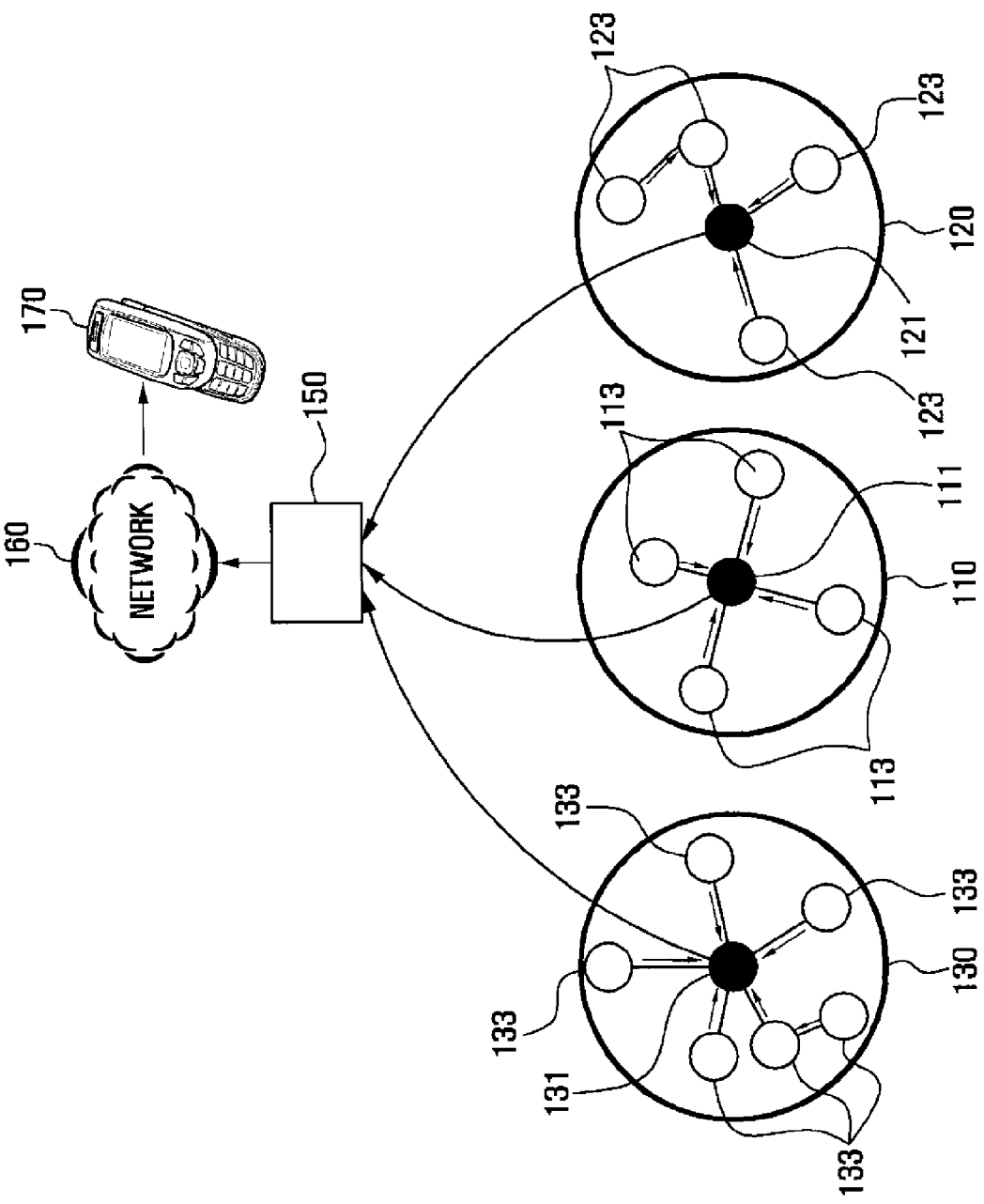
FIG. 1 is a schematic configuration diagram illustrating a general wireless sensor network system.

FIG. 1 is a schematic configuration diagram illustrating a general wireless sensor network system.

Referring to FIG. 1, the wireless sensor network system includes a plurality of clusters 110, 120, and 130, a sink node 150, a network 160, and a communication terminal 170. The clusters 110, 120, and 130 are configured to be mutually independent of each other. The clusters 110, 120, and 130 include, respectively, cluster heads 111, 121, and 131, and sensor nodes 113, 123, and 133 other than that of the cluster heads 111, 121, and 131. In the clusters 110, 120, and 130, the cluster heads 111, 121, and 131 aggregate sensing data received from the sensor nodes 113, 123, and 133. The cluster heads 111, 121, and 131 transfer the aggregated sensing data to the sink node 150.

The sink node 150 is connected to the network 160 via a mobile communication network or a wired/wireless network. In the wireless sensor network system, a plurality of sink nodes 150 can be provided. That is, the sink node 150 provides the network 160 with the aggregated sensing data received from the cluster heads 111, 121, and 131. The network 160 provides the communication terminal 170 connected to the network 160 with the received sensing data.

Figure 2:
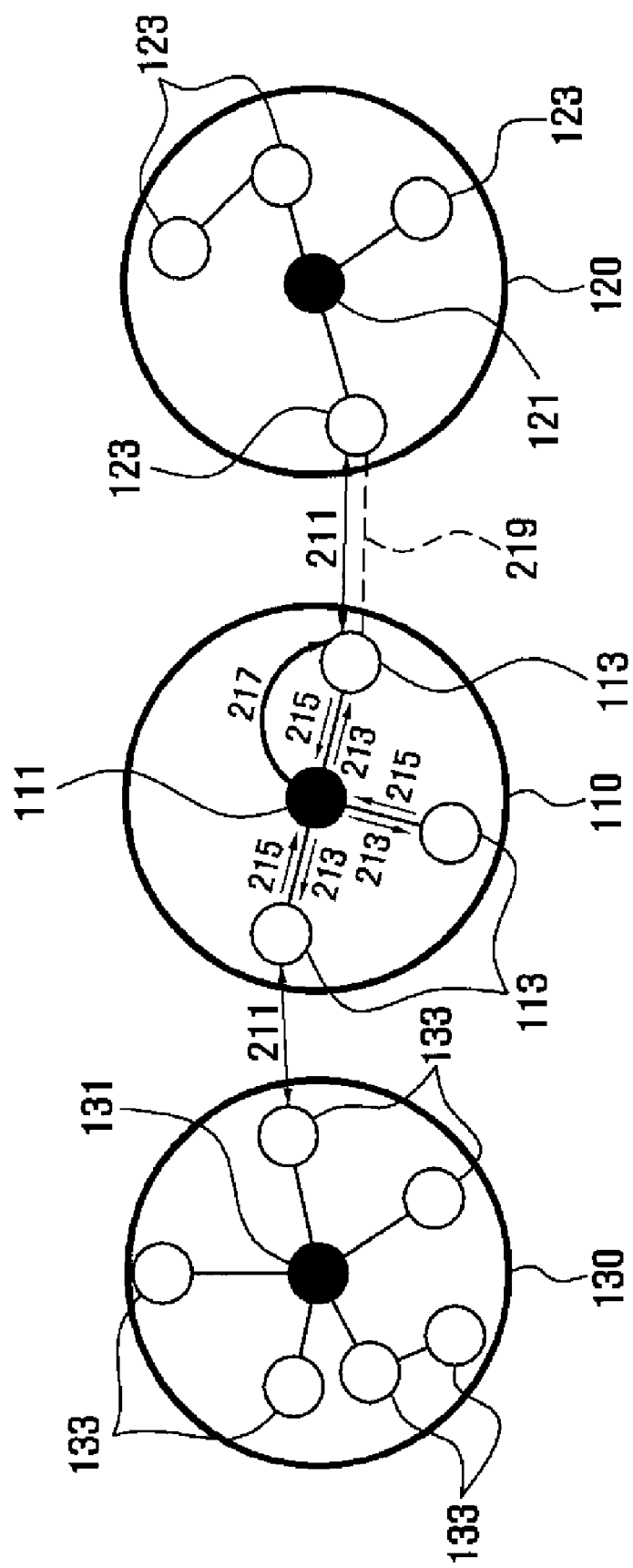
FIG. 2 is a diagram illustrating signal flows when performing a cluster management process according to an exemplary embodiment of the present invention.

FIG. 2 is a diagram illustrating signal flows when performing a cluster management process according to an exemplary embodiment of the present invention. In this exemplary embodiment, it is assumed that a threshold size of a cluster is 5 and a maximum size is 10.

Referring to FIG. 2, the sensor nodes 113, 123, and 133 are located in the outer region of the corresponding cluster 110, 120, and 130 in the vicinity of the adjacent clusters 110, 120, and 130, and the sensor nodes are referred to as leaf sensor nodes 113, 123, and 133. The leaf sensor nodes 113 detect cluster information of the corresponding adjacent clusters 120 and 130 through signal flows 211.

More specifically, in the wireless sensor network system, the cluster head 111 and the sensor nodes 113 periodically transmit a message, for example, a HELLO message, at a set time interval. This message is used to determine a link stability value between the cluster head 111 of the cluster 110 and the cluster heads 121 and 131 and the sensor nodes 123 and 133 of the adjacent clusters 120 and 130, respectively, and between the leaf sensor nodes 113 of the cluster 110 and the cluster heads 121 and 131 and the sensor nodes 123 and 133 of the adjacent clusters 120 and 130, respectively. In other words, when a HELLO message having a link quality indicator equal to or greater than a set link quality indicator (LQI) is received, the cluster heads 121 and 131 or the sensor nodes 123 and 133 increase the link stability values of the adjacent cluster head 111 or the sensor nodes 113. When no HELLO message is received or a HELLO message having a link quality indicator less than the set LQI is received, the cluster heads 121 and 131, or the sensor nodes 123 and 133, decrease the link stability values of the adjacent cluster head 111 or the sensor nodes 113. Thus, the cluster heads 121 and 131, or the sensor nodes 123 and 133, can respectively determine the link stability values of the adjacent cluster head 111 or the sensor nodes 113.

Still referring to FIG. 2, the HELLO message typically includes cluster information of the cluster 110, including a cluster size, a cluster identifier, a node address, and the like. When the HELLO message is received, the leaf sensor nodes 123 and 133 can determine cluster information of the corresponding adjacent cluster 110.

Next, in the cluster 110 shown in FIG. 2, the cluster head 111 transmits request messages for requesting cluster information of the adjacent clusters 120 and 130 to the leaf sensor nodes 113 in signal flows 213. In other words, the cluster head 111 compares the cluster size of the cluster 110 with the threshold size in a set period. When the cluster size of the cluster 110 is less than the threshold size, the cluster head 111 transmits the request messages to the leaf sensor nodes 113.

When the request messages are received, the leaf sensor nodes 113 transmit the cluster information of the adjacent clusters 120 and 130 to the cluster head 111 in signal flows 215. At this time, the leaf sensor nodes 113 can transmit cluster sizes and cluster identifiers of the cluster 120 and 130.

When the cluster information of the other clusters 120 and 130 is received, the cluster head 111 selects the cluster 120 having a minimum cluster size, from the clusters 120 and 130. The cluster head 111 selects the leaf sensor node 113 which has transmitted the cluster information of the selected cluster 120 and transmits a cluster merge command message thereto in signal flow 217.

Upon receiving the cluster merge command message, the leaf sensor node 113 performs a pseudo join operation with the sensor node 123 having a highest link stability value among the sensor nodes 123 of the selected cluster 120 in flow signal 219. That is, the leaf sensor node 113 maintains a join state in the corresponding cluster 110 and temporarily forms a join state in the adjacent cluster 120. Thus, the cluster 110 is merged into the selected adjacent cluster 120. That is, the selected adjacent cluster 120 becomes a master cluster of the cluster 110, and the cluster 110 switches to a slave cluster thereof.

Although not illustrated, if, after pseudo-joining to the adjacent cluster 120, the cluster size of the cluster 110 is equal to or greater than the threshold size as a result of comparing the cluster size of the cluster 110 with the threshold size in the set period, the cluster head 111 transmits a cluster split command message to the leaf sensor node 113 that has pseudo-joined the cluster 120. Upon receiving the cluster split command message, the leaf sensor node 113 releases the join state in the cluster 120 that it has mutually pseudo-joined. That is, the cluster 110 switches to a master cluster independent from the adjacent cluster 120. Note that when there is a cluster split, splitting back into the same two clusters that formed the pseudo join is necessary.

Figure 3:
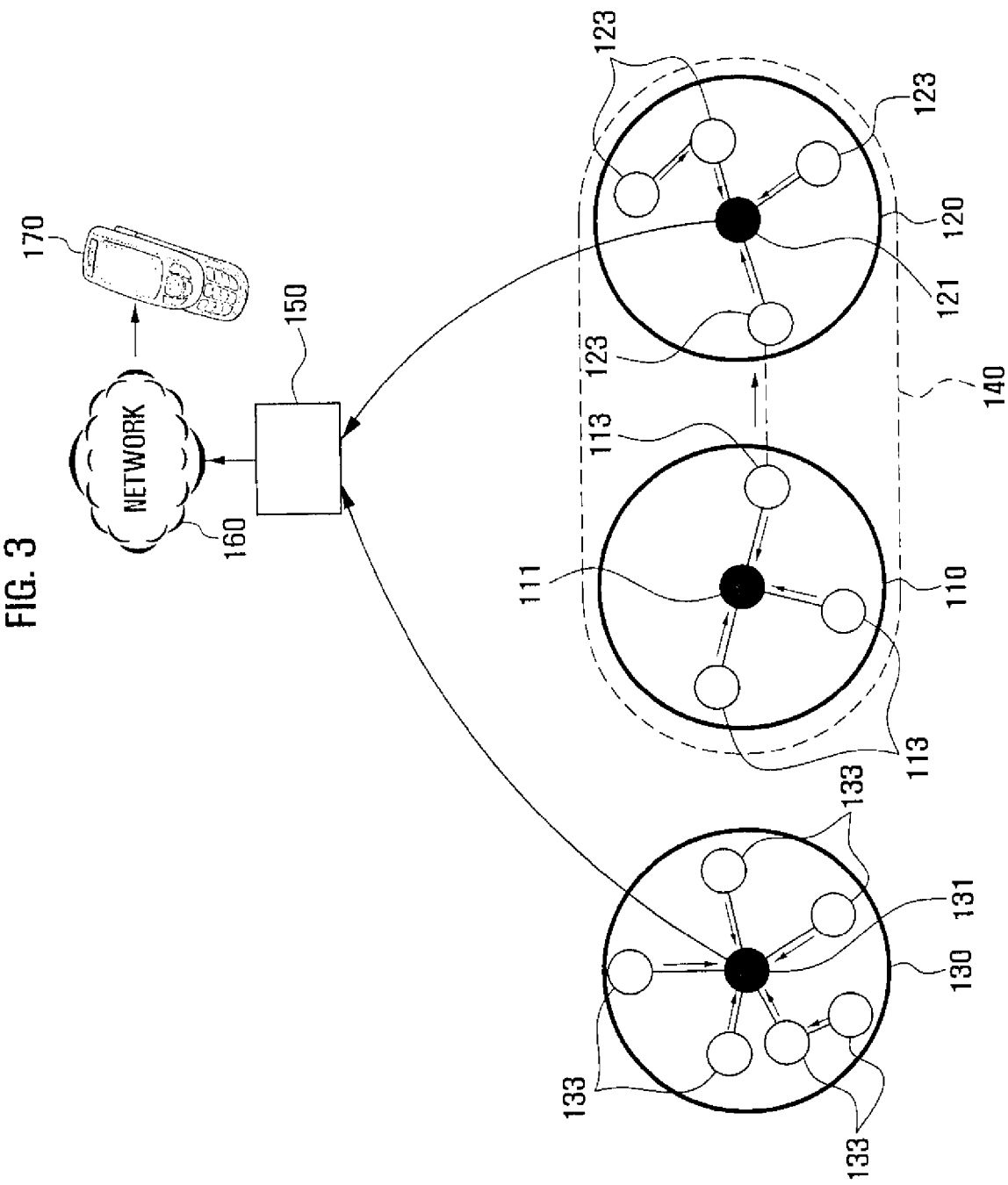
FIG. 3 is a schematic configuration diagram illustrating a wireless sensor network system according to another exemplary embodiment of the present invention.

FIG. 3 is a schematic configuration diagram illustrating another wireless sensor network system according to an exemplary embodiment of the present invention. The wireless sensor network system of this embodiment has the basic configuration of the wireless sensor network system shown in FIG. 1. Therefore, a detailed description of the basic configuration is omitted.

Referring to FIG. 3, the wireless sensor network system includes a plurality of clusters 110, 120, and 130, wherein two clusters 110 and 120 are merged into a cluster 140, as shown by the dotted lines. At this time, in the merged cluster 140, the cluster 120 comprises a master cluster and the cluster 110 comprises a slave cluster. When the mater cluster 120 receives a join request, the cluster head 121 compares the cluster size of the cluster 120 with a maximum size. When the cluster size of the cluster 120 is less than a maximum size as a comparison result, the cluster head 121 allow the join, thereby forming the merged cluster 140. When the cluster size of the cluster 120 is equal to or greater than a maximum size, the join is rejected.

In the cluster 140, a cluster head 111 of the slave cluster 110 primarily aggregates sensing data received from sensor nodes 113 of the slave cluster 110. The cluster head 111 of the slave cluster 110 transmits the primarily aggregated sensing data to a sensor node 123 of the master cluster 120 with which the slave cluster 110 has mutually pseudo-joined. Thereafter, the cluster head 121 of the master cluster 120 secondarily aggregates sensing data received from sensor nodes 123 of the master cluster 120 and the primarily aggregated data. The cluster head 121 of the master cluster 120 then transfers the secondarily aggregated sensing data to a sink node 150.

In the merged cluster 140, the cluster head 111 of the slave cluster 110 determines the cluster size of the slave cluster 110. For example, when the cluster size of the slave cluster 110 changes, the cluster head 111 of the slave cluster 110 notifies the master cluster 120 of the changed cluster size. The cluster head 121 of the master cluster 120 then determines the sum of the cluster size of the master cluster 120 and the cluster size of the slave cluster 110. When the cluster size sum changes, the cluster head 121 of the master cluster 120 does not notify the slave cluster 110 of the cluster size sum.

Figure 4:
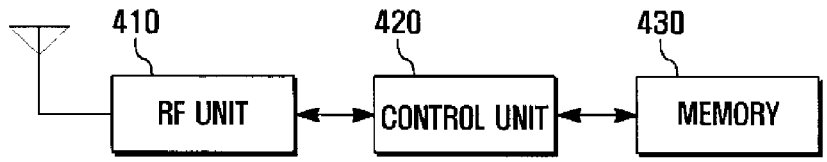
FIG. 4 is a block diagram illustrating a schematic configuration of cluster heads and sensor nodes in the wireless sensor network system of FIG. 3.

FIG. 4 is a block diagram illustrating a schematic configuration of the cluster heads 111, 121 and 131, and the sensor nodes 113, 123 and 133 in the wireless sensor network system shown in FIG. 3.

Referring to FIG. 4, each of the cluster heads 111, 121, and 131 and the sensor nodes 113, 123, and 133 includes an RF unit 410, a control unit 420, and a memory 430.

The RF unit 410 performs an RF communication function for the corresponding cluster head 111, 121, or 131 or for the sensor nodes 113, 123 or 133. The RF unit 410 typically includes an RF transmitter for up-converting a frequency of a signal to be transmitted, and amplifying the signal, and an RF receiver for low noise-amplifying a received signal and down-converting a frequency thereof.

The control unit 420 typically controls the overall operation for the corresponding cluster head 111, 121, or 131, or for the sensor nodes 113, 123 or 133. Further, the control unit 420 includes a data processing unit having a transmitter for encoding and modulating a signal to be transmitted and a receiver for demodulating and decoding a received signal. The data processing unit can be provided with a modem and a codec.

For example, still referring to FIGS. 3 and 4, the control unit 420 of the cluster head 111 of the cluster 110 counts a set period when the cluster head 111 is selected according to the exemplary embodiment of the present invention. When the set period has elapsed, the control unit 420 of the cluster head 111 compares the cluster size of the cluster 110 with a threshold size and determines whether to merge the cluster 110 into another cluster (such as 120 or 130), or to split from the cluster 120 or 130.

According to an exemplary embodiment of the present invention, the control unit 420 of the cluster head 111 can perform a merge or split operation according to a determination result. For example, when a join request is made, the control unit 420 of the cluster head 111 compares the cluster size with a maximum size and determines whether to allow the join. When receiving sensing data from sensor node 113, the control unit 420 of the cluster head 111 aggregates the sensing data and transmits the data through the RF unit 410.

The memory 430 is provided with a program memory and a data memory. The program memory typically stores an operational program of the corresponding cluster head 111, 121, or 131, or the sensor nodes 113, 123 or 133, and a program for managing the corresponding cluster 110, 120, or 130 according to the exemplary embodiment of the present invention.

More particularly, the data memory stores data generated while the program is in operation. At this time, the memory 430 stores the cluster size, the threshold size, and the maximum size of the corresponding cluster 110, 120, or 130. The memory 430 also stores the period set to compare the cluster size with the threshold size.

Figure 5:
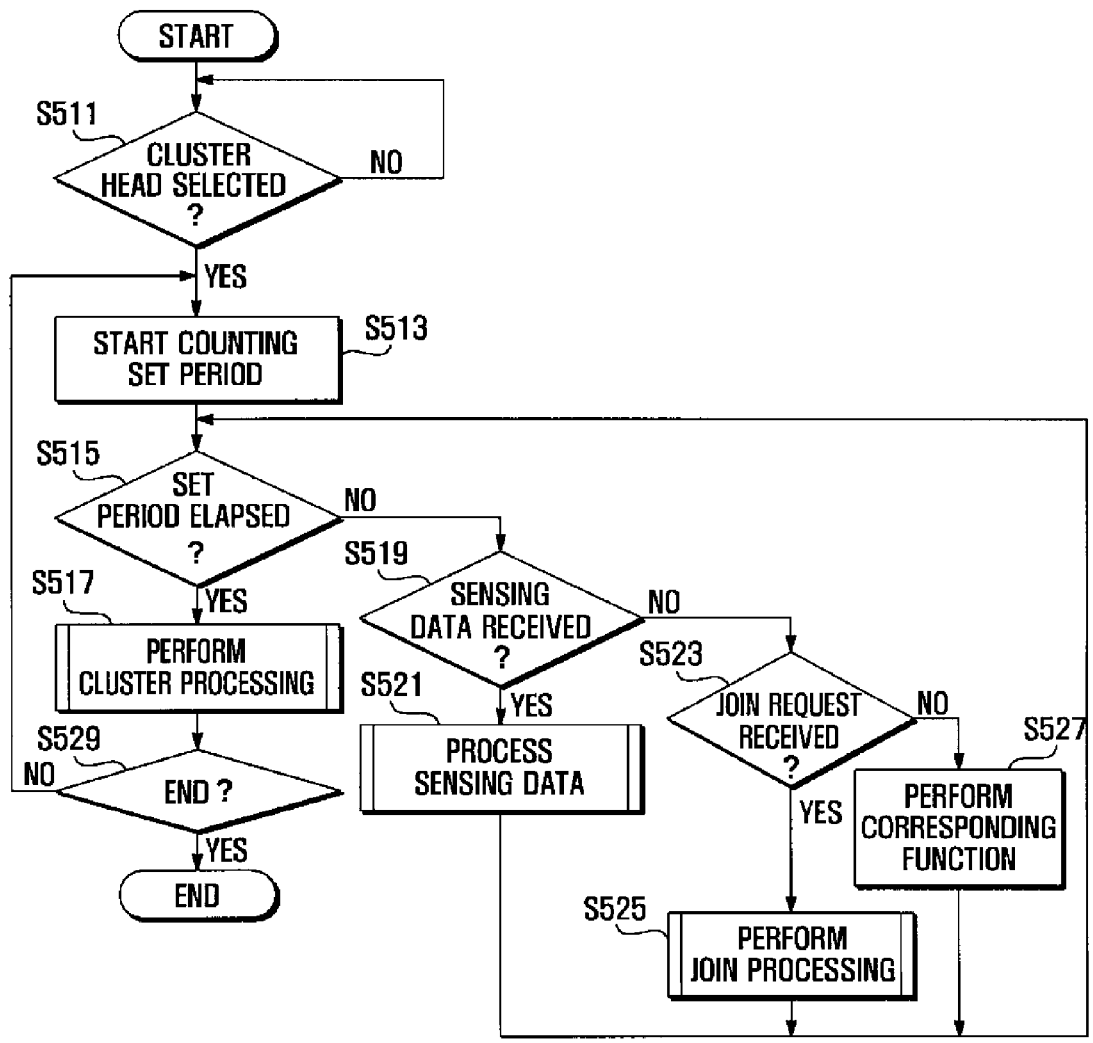
FIG. 5 is a flowchart illustrating a cluster management method of a wireless sensor network system according to another exemplary embodiment of the present invention.

FIG. 5 is a flowchart illustrating a cluster management method of a wireless sensor network system according to another exemplary embodiment of the present invention. The claimed invention is not limited to the cluster management method shown and described herein. A person of ordinary skill in the art understands and appreciates that some of the processes of the flowchart of FIG. 5 are shown in more detail in FIGS. 6-8.

Referring now to FIG. 5, in the cluster management method of this exemplary embodiment, firstly the control unit 420 of one of the sensor nodes 113 of the cluster 110 is selected as a cluster head 111 (S511). When the cluster head 111 is selected, the control unit 420 of the cluster head 111 starts to count the set period (S513).

The control unit 420 of the cluster head 111 determines whether the set period has elapsed (S515). When the set period has elapsed, the control unit 420 of the cluster head 111 performs cluster processing of the cluster 110 (S517). The cluster processing comprises the control unit 420 of the cluster head 111 comparing the cluster size with the threshold size. According to the comparison result, the control unit 420 of the cluster head 111 can either merge the cluster 110 into another cluster (120 or 130), or the control unit can split the cluster 110 from another cluster (120 or 130). A process in which the control unit 420 of the cluster head 111 performs cluster processing of the cluster as specified in step (S517) will now be described hereafter with reference to FIG. 6.

Figure 6:
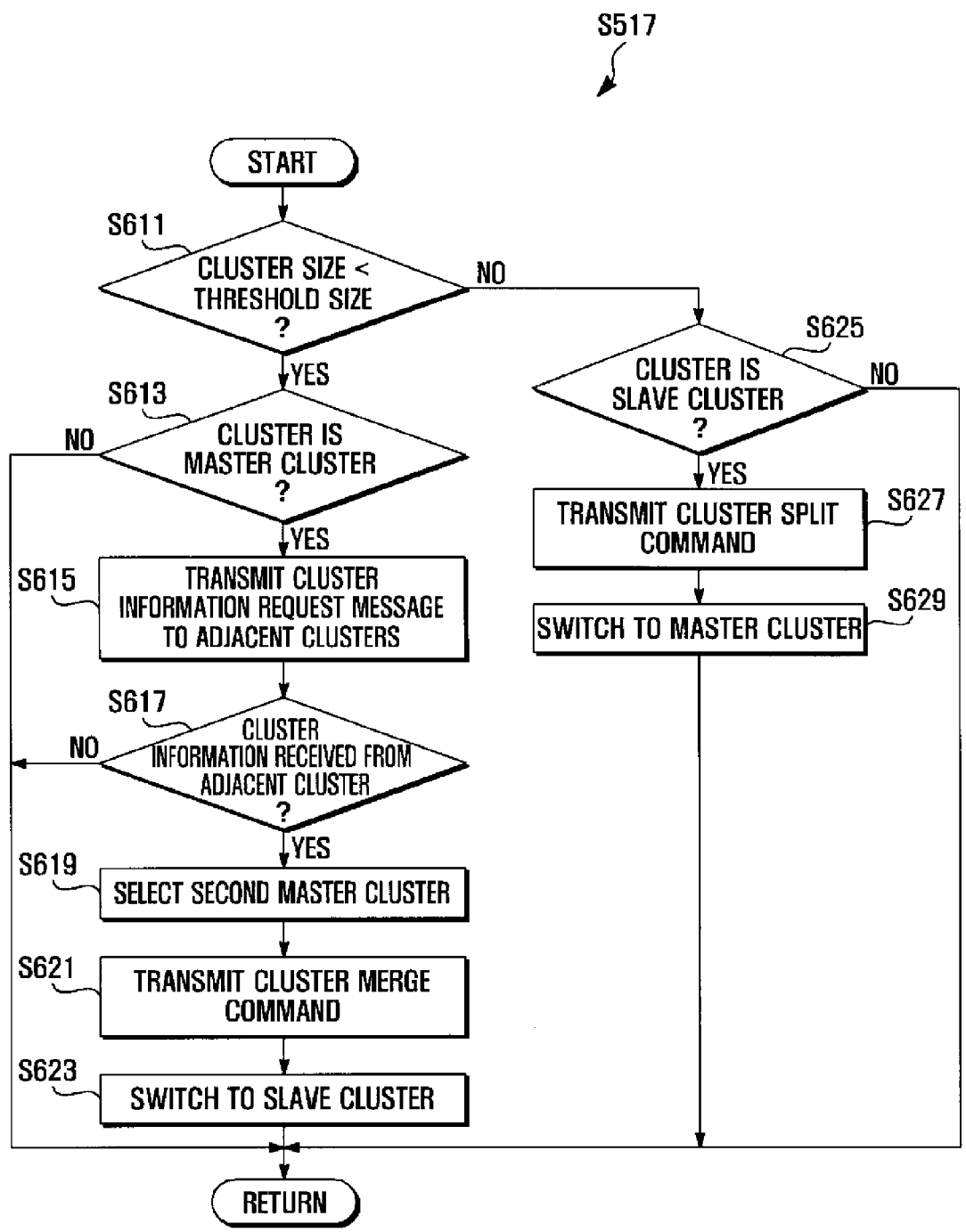
FIG. 6 is a flowchart illustrating a cluster processing process in the method of FIG. 5.

FIG. 6 is a flowchart illustrating an example of the cluster processing process (S517) in the method of FIG. 5.

Referring to FIG. 6, the control unit 420 of the cluster head 111 determines whether the cluster size is less than the threshold size when the set period has elapsed (S611). When the cluster size of the cluster 110 is less than the threshold size, the control unit 420 of the cluster head 111 determines whether or not the cluster 110 comprises a master cluster (S613). When the cluster 110 is determined to be a master cluster, the control unit 420 of the cluster head 111 transmits a cluster information request message to the leaf sensor node 113 (S615) to receive cluster information about adjacent clusters 120 and 130. When cluster information about adjacent clusters 120 and 130 is received by the control unit 420 of the cluster head 111(S617), the control unit 420 of the cluster head 111 selects a master cluster into which the cluster 110 is merged (S619). At this time, the control unit 420 of the cluster head 111 selects the cluster 120 which has a minimum cluster size. Then, the control unit 420 of the cluster head 111 transmits a cluster merge command message to the leaf sensor node 113 from which the cluster information of the selected cluster 120 was received (S621). The control unit 420 of the cluster head 111 switches the cluster 110 to the slave cluster (S623) and the process then returns to the method of FIG. 5.

When the cluster size of the cluster 110 is equal to or greater than the threshold size at step S611, the control unit 420 of the cluster head 111 determines whether or not the cluster 110 is a slave cluster (S625). Still, at (627) when the cluster 110 is determined to be a slave cluster, the control unit 420 of the cluster head 111 transmits a cluster split command message to the leaf sensor node 113 that is pseudo-joined in another cluster 120. The control unit 420 of the cluster head 111 then switches the cluster 110 to a master cluster (S629), and the process returns to the method of FIG. 5.

Still referring to FIG. 6 when the cluster 110 is determined as not being a master cluster at step S613, or when cluster information about adjacent clusters 120 and 130 is not received at step S617, the process then returns to the method of FIG. 5.

When the cluster 110 is determined as not being a slave cluster at step S625, the process returns to the method of FIG. 5.

Returning to FIG. 5, when the set period has not elapsed at step S515, the control unit 420 of the cluster head 111 determines whether sensing data has been received (S519). Now at (S521) when the sensing data has been received, the control unit 420 of the cluster head 111 processes the sensing data (S521). At this time, the control unit 420 of the cluster head 111 aggregates and transmits the sensing data.

Figure 7:
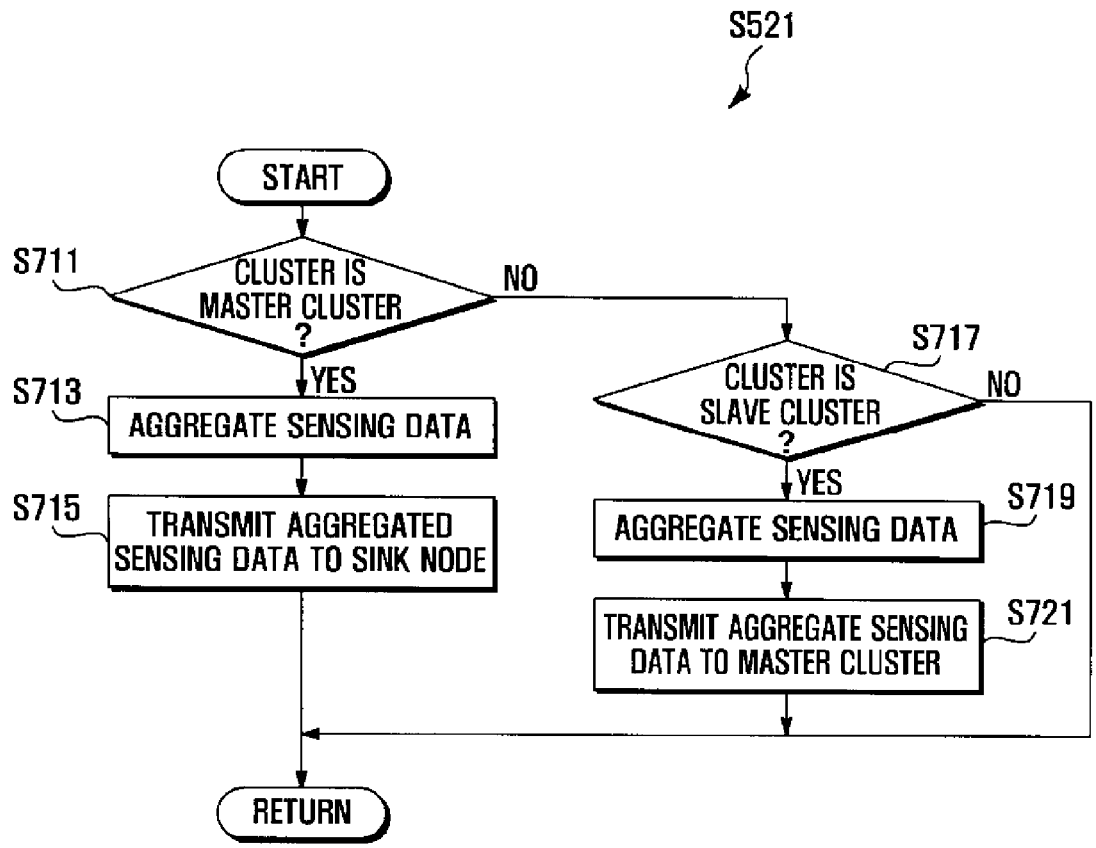
FIG. 7 is a flowchart illustrating a sensing data processing process in the method of FIG. 5.

A process in which the control unit 420 of the cluster head 111 processes the sensing data is described hereafter with reference to FIG. 7.

FIG. 7 is a flowchart illustrating providing non-limiting examples of the sensing data processing process (S521) in the method of FIG. 5.

Referring to FIG. 7, the control unit 420 of the cluster head 111 determines whether or not the cluster 110 is a master cluster (S711). When the cluster 110 is determined to be a master cluster, the control unit 420 of the cluster head 111 aggregates the received sensing data (S713). At this time, the control unit 420 of the cluster head 111 may also receive aggregated sensing data from a slave cluster of the cluster 110. The control unit 420 of the cluster head 111 then transmits the aggregated sensing data to the sink node 150 (S715), and the process returns to the method of FIG. 5.

When the cluster 110 is determined as not being a master cluster at step S711, the control unit 420 of the cluster head 111 determines whether or not the cluster 110 is a slave cluster (S717). When the cluster 110 is determined as being a slave cluster, the control unit 420 of the cluster head 111 aggregates the received sensing data (S719). The control unit 420 of the cluster head 111 then transmits the aggregated sensing data to the master cluster (S721), and the process returns to the exemplary method of FIG. 5.

Returning back to FIG. 5, when sensing data is received at step S519, the control unit 420 of the cluster head 111 determines whether a join request is received (S523). When a join request is received, the control unit 420 of the cluster head 111 performs join processing (S525). At this time, the join request can be generated from another external sensor node or from another adjacent cluster. The control unit 420 of the cluster head 111 then compares the cluster size of the cluster 110 with the maximum size. According to the comparison result, the control unit 420 of the cluster head 111 allows or rejects the join. A process in which the control unit 420 of the cluster head 111 performs join processing is described hereafter with reference to FIG. 8.

Figure 8:
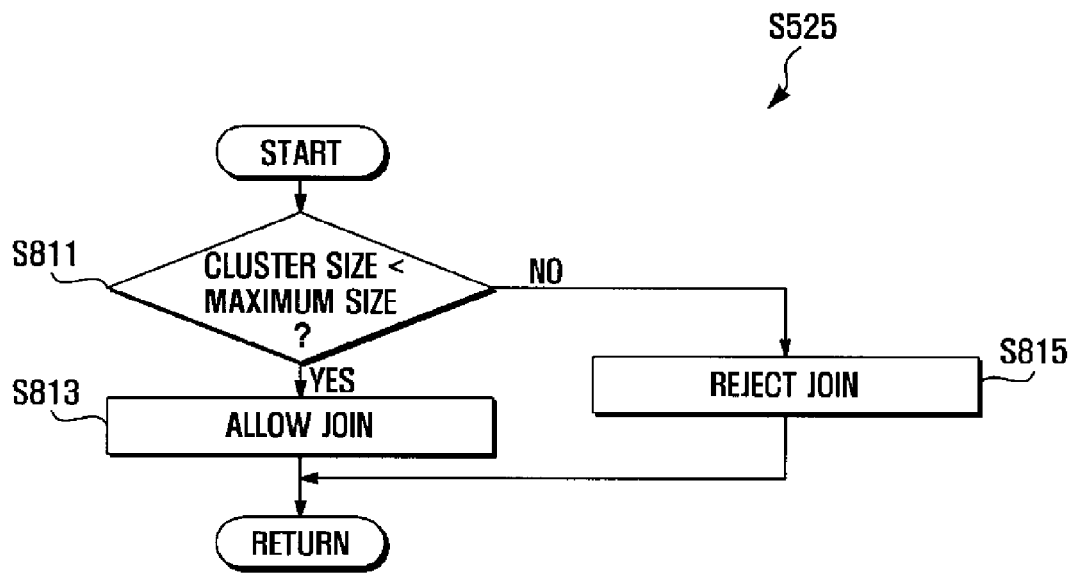
FIG. 8 is a flowchart illustrating a join processing process in the method of FIG. 5.

FIG. 8 is a flowchart illustrating one example of the join processing process (S525) in the exemplary method of FIG. 5.

Referring to FIG. 8, the control unit 420 of the cluster head 111 determines whether or not the cluster size is less than the maximum size when the join request is made (S811). When the cluster size of the cluster 110 is less than the maximum size, the control unit 420 of the cluster head 111 allows the join (S813), and the process returns to the exemplary method of FIG. 5.

When the cluster size of the cluster 110 is equal to or greater than the maximum size at step S811, the control unit 420 of the cluster head 111 rejects the join (S815), and the process returns to the exemplary method of FIG. 5.

Returning to FIG. 5, when a join request is not received at step S523, the control unit 420 of the cluster head 111 performs a corresponding function (S527), and the process returns to step S515. For example, the control unit 420 of the cluster head 111 may update the cluster size, or release a join according to a join release request, or transmit or receive a message, such as a HELLO message.

After performing cluster processing at step S517, the control unit 420 of the cluster head 111 determines whether to end the cluster management process (S529). When the cluster management process is not to be ended, the process returns to step 513.

According to the present invention, a first cluster is merged into another cluster when the cluster size of the first cluster is less than a threshold size. When the cluster size of the first cluster is equal to or greater than the threshold size after the merge operation, the first cluster can split from the other cluster. When the cluster size of each cluster is equal to or greater than a maximum size, each cluster does not join another sensor node or another cluster. Each cluster can maintain the cluster size to be equal to or greater than the threshold size and less than the maximum size. Therefore, a cluster head can maintain sensor node management efficiency within a specified range. Further, the cluster head can prolong the lifetime of a wireless sensor network by reducing the energy consumption required for data aggregation.

Although exemplary embodiments of the present invention have been described in detail hereinabove, it should be understood that many variations and modifications of the basic inventive concept herein described, which may appear to those skilled in the art, will still fall within the spirit and scope of the present invention as defined in the appended claims.

What is claimed is:

1. A cluster management method for a wireless sensor network system having a plurality of clusters, each cluster including at least one sensor node from which one is selected to operate as a cluster head, the cluster head aggregating sensing data collected from the at least one sensor node, the method operable in the cluster head, comprising:

determining a cluster size of a first cluster selected from the plurality of clusters;

merging the first cluster into a second cluster selected from the plurality of clusters when the cluster size of the first cluster is less than a threshold size; and switching the first cluster to become a slave cluster; and splitting the first cluster from the second cluster when the cluster size of the first cluster is equal to or greater than the threshold size; and switching the first cluster split from the second cluster to become a master cluster.

2. The cluster management method of claim 1, further comprising:

allowing, when a join request is made and the cluster size of the second cluster is less than a maximum size, a joining of the first cluster and the second cluster; and rejecting a joining of the first cluster and the second cluster, when a join request is made and the cluster size of the second cluster is equal to or greater than the maximum size.

3. The cluster management method of claim 1, wherein the merging of the first cluster comprises performing, by the cluster head of the first cluster, an operation of merging into the second cluster through a selected sensor node.

4. The cluster management method of claim 3, further comprising:
- aggregating, by the cluster head of the slave cluster, received sensing data from the at least one sensor node in the slave cluster; and
- transmitting, by the cluster head of the slave cluster, the aggregated sensing data to the second cluster.

5. The cluster management method of claim 3, wherein the second cluster has a smallest cluster size of clusters adjacent to the first cluster.

6. The cluster management method of claim 5, wherein the step of merging of the first cluster comprises selecting the second cluster having the smallest cluster size.

7. The cluster management method of claim 1, wherein the step of determining of the cluster size of the first cluster is performed by the cluster head of the first cluster, and wherein the cluster head of the first cluster stores the threshold size.

8. A wireless sensor network system comprising:
- at least one cluster having at least one sensor node for collecting sensing data and having a cluster head for aggregating the collected sensing data from the at least one sensor node, and means for determining a cluster size of a first cluster of said at least one cluster; and
- a sink node for receiving the aggregated sensing data from the cluster head,
- wherein when said first cluster comprises a first master cluster and the cluster size of the first cluster is less than a threshold size, the first cluster including means for:
  - merging into a second master cluster, and
  - switching the first cluster to a slave cluster of the second master cluster; and
- when the first cluster is a slave cluster and the cluster size of the first master cluster is equal to or greater than the threshold size, the first cluster including means for:
  - splitting the first cluster from the second master cluster; and
  - switching the first cluster to said first master cluster.

9. The wireless sensor network system of claim 8, wherein, when a join request is made and the cluster size of the cluster of said second master cluster is less than a maximum size, the cluster head of the second cluster allows a join of the first cluster, and, when a join request is made and the cluster size of the second cluster is equal to or greater than a maximum size, the cluster head of the second cluster rejects a join of the first cluster.

10. The wireless sensor network system of claim 8, wherein the cluster head of the first cluster includes means for merging into the second master cluster through a selected sensor node.

11. The wireless sensor network system of claim 10, wherein the cluster head of the slave cluster for aggregating sensing data received from the at least one sensor node in the slave cluster, and for transmitting the aggregated sensing data to the second master cluster.

12. The wireless sensor network system of claim 10, wherein the second master cluster has a smallest cluster size of clusters adjacent to the first cluster.

13. The wireless sensor network of claim 12, wherein said RF unit including an RF transmitter for up-converting a frequency of a signal to be transmitted, and amplifying the signal, and
- an RF receiver for low-noise-amplifying a received signal and for down converting a frequency thereof.

14. The wireless sensor network of claim 12, wherein the control unit for controlling overall operation of the cluster head and said at least one sensor node, further comprises a data processing unit having a transmitter for encoding and modulating a signal to be transmitted and a receiver for demodulating and decoding a received signal.

15. The wireless sensor network of claim 14, wherein the control unit for performing a merge or split operation according to a determination result.

16. The wireless sensor network of claim 12, wherein the memory for storing an operating program of the cluster head or said at least one sensor node, and for storing the cluster size, threshold size, and maximum size of the first cluster of said at least one cluster.

17. The wireless sensor network system of claim 8, wherein the cluster head comprises an RF unit, a control unit and a memory.

* * * * *